(12) United States Patent
Kaplan et al.

(10) Patent No.: US 8,149,414 B2
(45) Date of Patent: Apr. 3, 2012

(54) METHOD AND DEVICE FOR MEASURING THE SPECTRAL PHASE OR THE COMBINED SPECTRAL AND SPATIAL PHASES OF ULTRA SHORT LIGHT PULSES

(75) Inventors: Daniel Kaplan, Paris (FR); Thomas Oksenhendler, Gometz le Chatel (FR); Nicolas Forget, Orsay (FR)

(73) Assignee: Fastlite, Paris (FR)

( * ) Notice: Subject to any disclaimer, the term of this patent is extended or adjusted under 35 U.S.C. 154(b) by 169 days.

(21) Appl. No.: 12/345,229

(22) Filed: Dec. 29, 2008

(65) Prior Publication Data

US 2009/0168070 A1    Jul. 2, 2009

(30) Foreign Application Priority Data

Dec. 26, 2007    (FR) ..................... 07 09092

(51) Int. Cl.
*G01B 9/02*    (2006.01)
(52) U.S. Cl. ...................... 356/450; 356/451
(58) Field of Classification Search .......... 356/450
See application file for complete search history.

(56) References Cited

U.S. PATENT DOCUMENTS 6,108,085 A     8/2000   Sheik-Bahae
7,599,067 B2 *  10/2009  Walmsley et al. ........... 356/450

OTHER PUBLICATIONS

C. Dorrer, et al., "Characterization of the spectral phase of ultrashort light pulses", Comptes Rendus de l'Acadamie des Sciences, Series IV, Dec. 2001, p. 1415-1426, vol. 2, No. 10, Acadamie des sciences/ Editions scientiques et medicales Elsevier SAS.
C. Iaconis et al., "Spectral phase interferometry for direct electric-field reconstruction of ultrashort optical pulses", Optics Letters, vol. 23, No. 10, pp. 792-794, May 15, 1998.
Y. R. Shen, "The Principles of Nonlinear Optics: Equation 1.10", John Wiley & Sons, Inc. (1984).

* cited by examiner

*Primary Examiner* — Hwa Lee
(74) *Attorney, Agent, or Firm* — Browdy and Neimark, PLLC

(57) ABSTRACT

The method and device for measuring the spectral phase or combined spectral and spatial phases of ultra short light pulses, consisting of a decomposition of the light pulse to be measured in two identical replicas called signal pulse and primary reference pulse, respectively, of different polarization or direction and the phase characteristics of which are essentially identical to the original pulse, a temporal filtering of the primary reference pulse by a nonlinear interaction generating a secondary reference pulse of average frequency essentially identical and of spectral width greater than the spectral width of the primary reference pulse, and a spectral interferometry measurement by recombination of this secondary reference pulse and the signal pulse with a given temporal offset.

9 Claims, 7 Drawing Sheets

METHOD AND DEVICE FOR MEASURING THE SPECTRAL PHASE OR THE COMBINED SPECTRAL AND SPATIAL PHASES OF ULTRA SHORT LIGHT PULSES

BACKGROUND OF THE INVENTION

1. Field of the Invention

The present invention concerns a method and device for measuring the spectral phase or the combined spectral and spatial phases of ultra short light pulses.

2. Description of the Prior Art

It primarily concerns spectral phase measurements, i.e. variations in the phase according to the frequency in the spectrum of these pulses. Secondarily, it relates to the concomitant measurement of the spatial phase, i.e. phase variations according to the position in a plane perpendicular to the direction of propagation. Indeed, simultaneous measurements of spectral and spatial phase, called spatial-temporal measurements, are important to characterize the sources of ultra short pulses and related devices such as compressors and temporal extenders.

In general, one knows that the measurement of the amplitude and phase of ultra short light pulses with durations between several femtoseconds and several picoseconds, presents many difficulties.

Various measurement methods of the prior art are described in the following documents:

I. A. Walmsley and R. Trebino: "Measuring fast pulses with slow detectors", Optics and Photonics News, March 1996, vol. 7, No. 3, p. 23 hereinafter designated (WT), C. Dorrer and M. Joffre: "Characterization of the spectral phase of ultrashort light pulses", C.R. Acad. Sc. Paris, t.2, series IV, p. 1415-1426, 2001 hereinafter designated (DJ).

When one has a reference pulse of known phase, a simple method described in the (DJ) document to measure the spectral phase consists of superimposing this reference pulse on the pulse to be measured offset temporally. The spectrum of a pulse of this type has oscillations with amplitude whereof one can deduce the phase difference between the pulse to be measured and the reference pulse for each wavelength. This method will be called simple spectral interferometry (SSI). It uses only linear optical interactions. It can be applied jointly to the spectral phase and the spatial phase.

In general, however, one does not have this type of reference pulse and the prior art comprises various methods called "self-referenced". It is necessary for all of these methods to use at least one nonlinear response optical element. This is recalled in particular in the (DJ) document.

Among the self-referenced methods, one can cite the FROG (Frequency Resolved Optical Gating) method and the SPIDER (Spectral Phase Interferometry for Direct Electric Field Reconstruction) method. These two methods are described in the following documents, respectively:

R. Trebino and D. J. Kane: "Using phase retrieval to measure the intensity and phase of ultrashort pulses: Frequency Resolved Optical Gating", J. Opt. Soc. Am. A11, p. 2429-2437, 1993, with regard to the FROG method, C. Iaconis and I. A. Walmsley: "Spectral Phase Interferometry for Direct Electric field Reconstruction of ultrashort optical pulses", Opt. Lett, 23, p. 729-794, 1998, with regard to the SPIDER method.

In all cases, several replicas of the initial pulse, spectrally modified or not, are mixed non-linearly in order to obtain the useful signal. The methods differ depending on whether they need a single measurement (one-shot measurement) or several measurements corresponding to successive light pulses. In the latter case, it is necessary for these successive pulses to be essentially identical. The methods also differ depend on whether the phase can be derived from measurement through a direct algorithm, as is the case for (SSI), or whether they use a successive adjustment procedure aiming to minimize the difference between a calculation of the expected measurement for a test spectral phase and the measurement itself. The FROG method, for example, uses a technique of successive adjustments, while the SPIDER method allows the use of a direct algorithm. The direct algorithm is in general considered to be preferable given the possible uncertainties on the convergence of the successive adjustments.

Moreover, the methods differ as to their ability to perform a spatial-temporal measurement as discussed above. The FROG method does not allow this combined measurement without ambiguities between temporal and spatial. A spatial-temporal measurement configuration, from a one-shot SPIDER method, was done at the cost of a greatly increased complexity of optical assembly and to the detriment of the instrument's sensitivity. It is described in the following document:

C. Dorrer, E. M. Kosik, I. A. Walmsley: "Spatio-temporal characterization of the electric filed of ultrashort optical pulses using two-dimensional shearing interferometry", App. Phys. B, 74, p. 209-217, 2002.

It must be noted that in French patent 02 05872 "Method and device for measuring the phase and amplitude of ultra short light pulses", it was proposed to realize various self-referenced methods from the prior art in a single instrument comprising a pulse shaper, a non-linear element and a detector element. The pulse shaper is a device making it possible to apply a programmable linear filter to a pulse, i.e. to modify the phase and spectral amplitude of this pulse in a controlled manner. Among the devices of the prior art, one distinguishes those based on a zero-dispersion "4f" line configuration, as described in the publication of D. E. Leaird, and A. M. Weiner, "Femtosecond direct space-to-time pulse shaping," IEEE Journal of Quantum Electronics, vol. 37, pp. 494-504, (2001) and those founded on an acoustic-optical programmable dispersive filter (AODPF) as described in French patent 96 08510, "Device for controlling light pulses via a programmable acoustic-optical device".

OBJECT OF THE INVENTION

The invention more particularly aims to eliminate the drawbacks of said methods by exploiting the basic advantages of the (SSI) method, which are, among others, simplicity, sensitivity, one-shot measurement, obtaining the phase through a direct algorithm and the possibility of combined spatial-temporal measurements. The principle consists of obtaining a reference pulse with a known phase, or which can be deduced from the measurement, through an interaction of the pulse to be measured with a non-linear medium.

SUMMARY OF THE INVENTION

Thus, the method according to the invention may comprise the following steps:

a first step allowing a decomposition (S) of said ultra short light pulse (Ii) into two pulses, called signal pulse (Is) and primary reference pulse (Irp), respectively, of different polarization or propagation directions and whereof the phase characteristics are essentially identical to said ultra short light pulse (Ii), a second step allowing an interaction of said primary reference pulse (Irp) with a nonlinear optical material (DMNL), said interaction generating, through a nonlinear optical mechanism of odd order n greater than or equal to 3, a secondary reference pulse (Irs) of average frequency essentially identical to that of the primary reference pulse (Irp), of intensity proportional to the intensity of said primary reference pulse (Irp) carried to the n power, under conditions where the spectral width of said secondary reference pulse (Irs) is greater than the spectral width of said primary reference pulse (Irp), a third step allowing a spectral and/or spatial interferometry measurement (SPEC) through recombination (R) of said secondary reference pulse (Irs) and said signal pulse (Is), with a given or zero temporal offset and a given or zero angular offset.

Possibly this method may further comprise a step of extracting said ultra short light pulse and a step of characterizing said pulse so as to obtain an extracted pulse having a programmable and measured form.

This principle will be better understood in the description of an embodiment of the invention which will follow.

First, the reasons for which such a method differs from the existing methods will be described.

The SPIDER method is also an interferometric method. It is derived from a technique for measuring spectral phase called offset interferometry. In the case of the SPIDER method, this involves a spectral offset. The interference is realized between two identical pulses at a close frequency offset, obtained through nonlinear interaction of two replicas of the pulse to be measured with two different quasi-monochromatic waves, of frequencies f1 and f2. The quasi-monochromatic waves are obtained through linear filtering of the pulse to be measured. The final interferometric measurement is therefore done on a combination of two pulses both modified by nonlinear interaction. In the case of the present invention, the pulse to be measured is not modified and it is only the reference which is obtained through nonlinear interaction. The algorithm of the SPIDER method makes it possible to obtain not the phase itself, but the difference between the phases of two pulses offset in frequency by the difference f2−f1. The method therefore provides an approximation of the derivative of the phase according to the frequency. A compromise concerning the choice of frequencies f2 and f1 must be made because the increase of the difference f2−f1 increases sensitivity but decreases the spectral resolution of the measurement. Moreover, the temporal offset used for the interferometry technique must be determined with precision because it influences the measurement of the second derivative of the phase according to the frequency which is a practically significant quantity; in the (SSI) method, used in the present invention, imprecision on the temporal offset leads to an error on the derivative of the phase which is not significant.

The other methods, such as FROG, also use a combination of pulses and nonlinear interactions concerning all of these pulses. Moreover, in these methods spectral interferometry is either absent, or is not the basic technique for extraction of the phase.

BRIEF DESCRIPTION OF THE DRAWINGS

One embodiment of the method according to the invention will be described below, as a non-limiting example, with reference to the appended drawings in which.

DESCRIPTION OF THE PREFERRED EMBODIMENTS

Figure 1:
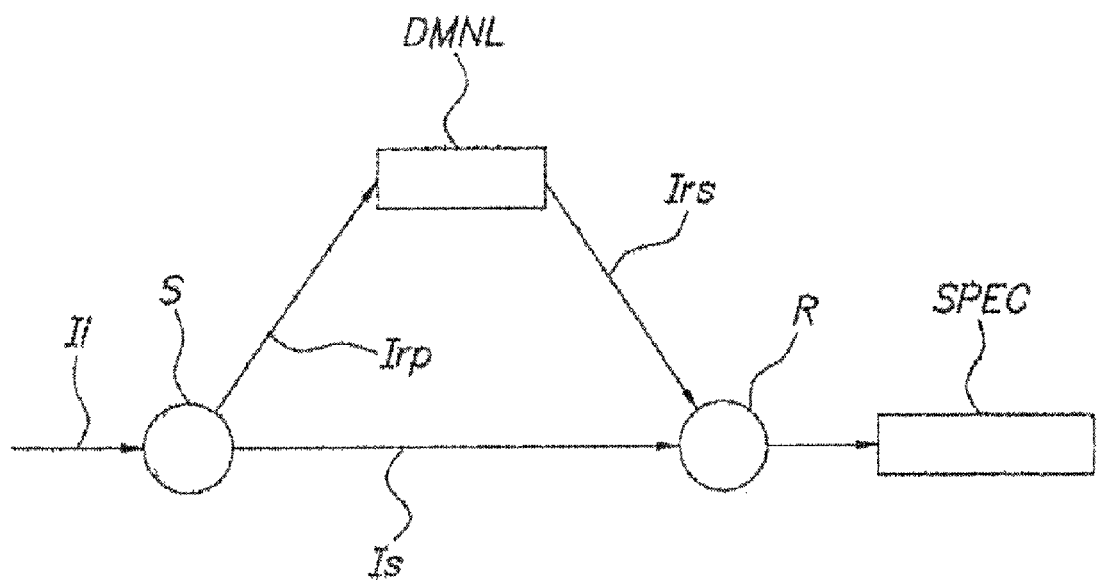
FIG. 1 is a diagrammatic illustration of a first version of assembly according to the invention.

In the example illustrated in FIG. 1, is comprised one or several pulse separation devices, designated by S, which, from an input pulse, produce two output pulses. There are several devices in the prior art performing this function. For some of these devices the polarizations of the two output pulses are crossed. The assembly also uses one or several pulse recombination devices, designated by R, producing, from two input pulses, a single output pulse realizing a summation of two input pulses. Certain techniques for realizing recombination devices comprise a selection of polarization of input pulses.

In the diagrammatic illustration of FIG. 1, the incident pulse to be measured Ii is first separated into two pulses Is, Irp, of crossed polarizations, s and r, respectively, by a device S. The polarization pulse r is designated as primary reference pulse Irp, and the polarization pulse s as signal pulse Is. The pulse Irp is then transferred to the input of an interaction device with a nonlinear medium, DMNL, defined by a nonlinear preponderant interaction of the third order producing a collinear light with polarization perpendicular to the incident polarization. In French, this type of mechanism is called collinear polarization rotation (rotation de polarisation colinéaire), and is designated in Anglo-Saxon literature as the XPW effect (cross-polarized wave). The effects of interactions of an ultra short pulse with an XPW effect material are described in the publication of A. Jullien, O. Albert, G. Cheriaux, J. Etchepare, S. Kourtev, N. Minkovski et S. M. Saltiel "Nonlinear polarization rotation of elliptical light in cubic crystals, with application to cross-polarized wave generation", Journal of Optical Society of America B 22, 2635 (2005). The usable materials are, for example, BaF2 and LiF formula fluorides. The DMNL device may also comprise the nonlinear material itself, optical focusing components such that the light intensity in the material is optimized for nonlinear effect. The secondary reference pulse Irs, exiting the DMNL device, is of polarization s. It is combined with the signal pulse Is, of polarization s, by a suitable recombination device R. A device of the SPEC spectrometer type measures the spectral intensity of the output pulse from the recombination device R. The optical paths in the signal path S⇒R and the reference path S⇒DMNL⇒R are adjusted such that the two mixed signals Is, Irs, linearly are temporally offset suitably to measure the spectral interferometry. If necessary, one skilled in the art may add a section introducing a mechanically adjustable delay so as to adjust this temporal offset. Likewise, a device for attenuating the light intensity may possibly be added on the signal path to obtain a suitable ratio of intensities between the two pulses Is, Irs, recombined, in order to optimize the spectral interferometry measurement. These additions, not essential to understanding of the operating principle, were not included in the diagram of FIG. 1.

Of course, several simultaneous measurement paths can be implemented using combinations of several elements S, R and SPEC.

The phase characteristics of the pulse leaving the DMNL device are examined below. Assuming first, the phase of the pulse to be measured is constant, the interaction of the third order leads to the superposition of spectral contributions of frequency triplets. If all of the frequencies of the spectrum have the same delay and contribute equally, it was shown in said publication, that in the case of a spectrum with a Gaussian shape the resulting spectral band is equal to the incident spectral band multiplied by the root of 3. In general, for more sufficiently reliable phase variations, the spectral band will be increased. Indeed, the output frequency corresponds to contributions of multiple triplets of frequencies having close delays. Under these conditions, an average effect reduces the phase variations in relation to the variations of the incident phase. This effect is shown in the theoretical calculations described below.

Simulations of the Phase of the Reference Pulse

For an incident pulse on the nonlinear medium defined by a complex field: $E(\omega)$, where $\omega=2\pi f$ is the optical pulse and f the optical frequency, one can calculate the nonlinear dielectric polarization $P_3$ of the material supposed to be thin, by: $P_3(\omega a)=\in_0 \Sigma \chi_3(\omega_1, \omega_2, \omega_3) E(\omega_1) E(\omega_2) E(\omega_3)$, where $\in_0$ is the dielectric constant of the vacuum, $\chi_3$ is the nonlinear susceptibility of order 3 and the summation $\Sigma$ operates on all of the triplets $(\omega_1, \omega_2, \omega_3)$ such as $(\omega=\omega_1+\omega_2+\omega_3)$. This calculation operates on all of the positive and negative frequencies. Frequencies close to the input frequency are obtained with triplets comprising two positive frequencies and one negative frequency. The complex field $E_3(\omega)$ leaving the DMNL device is deduced from this polarization through traditional optical calculations.

Figure 2A:
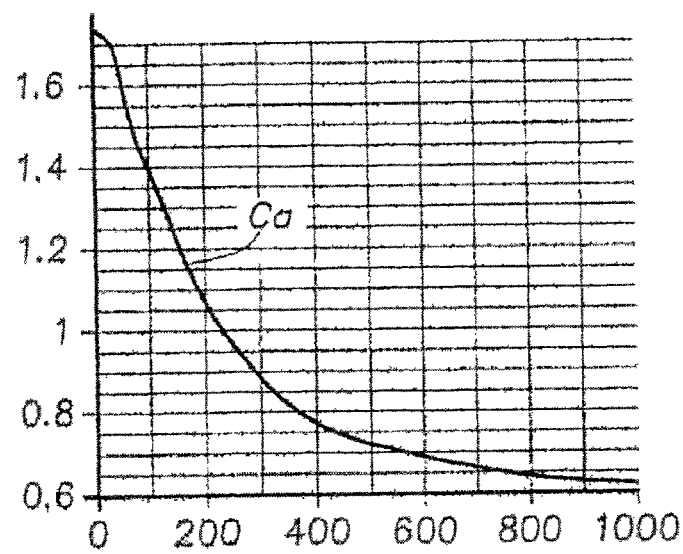
FIGS. 2a, 2b, 2c, illustrate variations of the relative band according to a constant $a_n$, for n=2, 3, 4.
Figure 2B:
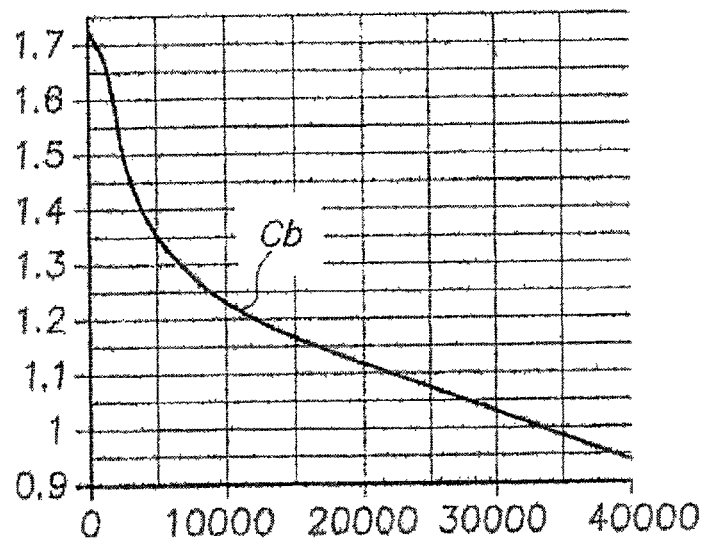
Figure 2C:
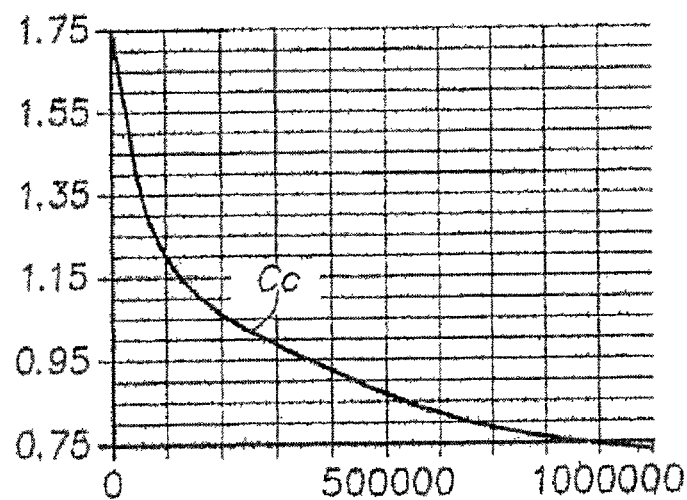

Assuming a Gaussian form for the amplitude $|E(\omega)|$, it is therefore possible to calculate the phase $\phi_3(\omega)$ and the amplitude $|E_3(\omega)|$. As an example, it is useful to examine dependencies in $\omega$ of the form $\phi(\omega)=a_n(\omega-\omega_0)^n$ where $\omega_0$ is the central optical pulsation of the Gaussian form of the amplitude and $a_n$ an independent constant of $\omega$. One defines the relative width as the ratio between the spectral width of $|E_3(\omega)|$ and the spectral width of $|E(\omega)|$, these widths being defined at mid-height of the intensity $|E|^2$. FIGS. 2a, 2b, 2c, show the variations of this relative width according to the coefficient $a_n$, for three values of n (n=2, 3, 4). For a null value of the coefficient $a_n$, the normalized width equals the root of three, as discussed above. When one increases $a_n$, the width decreases because the phase variations offset the various frequencies temporally, and they can no longer all mix indifferently. At strong values of $a_n$, the effect of increasing the width by mixing frequencies is no longer effective and the width is on the contrary reduced due to the cubic dependency of the output intensity according to the input intensity which led to a Gaussian spectrum with a width decreased by root of three.

In the example illustrated in FIGS. 2a, 2b, 2c, the curves Ca, Cb, Cc illustrate the amplitude $|E(\omega)|$ of Gaussian form, according to the coefficient $a_n$, for values of n, respectively n=2, 3 and 4.

Figure 3A:
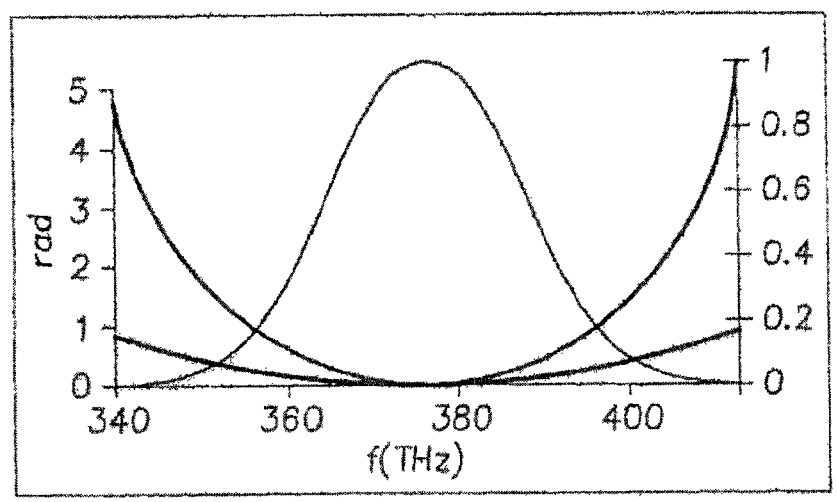
FIGS. 3a, 3b, 3c, illustrate the initial phase and the phase after nonlinear interaction, as well as the spectrum of the signal, for n=2, 3, 4.
Figure 3B:
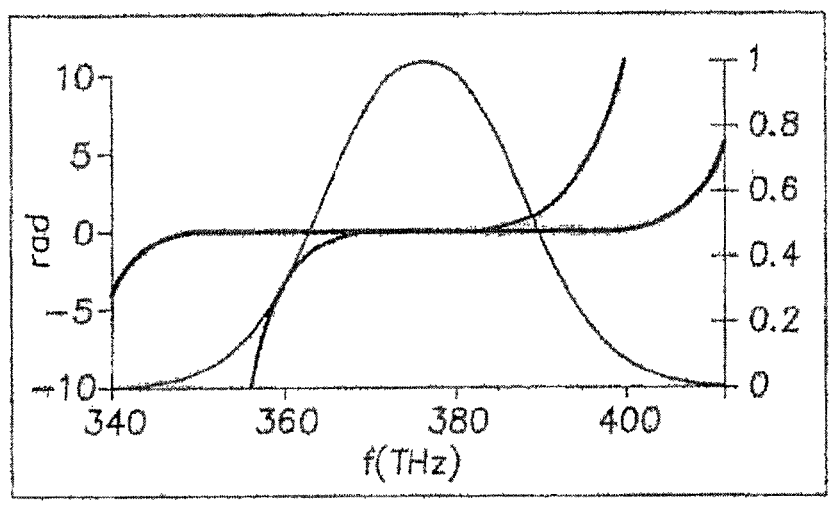
Figure 3C:
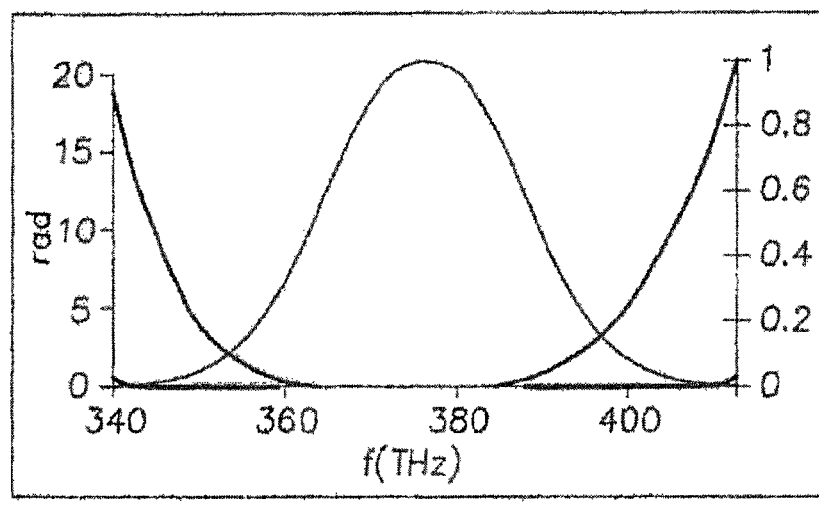

To work under favorable frequency mixing conditions according to the invention, it is advisable to choose conditions leading to an enlargement factor greater than 1. The curves of FIGS. 3a, 3b and 3c show the initial phase $\phi(\omega)$, namely C1a, C1b, C1c, and the phase after nonlinear interaction $\phi_3(\omega)$, namely C2a, C2b, C2c, for values of n, n=2, 3 and 4, respectively, $a_n$ in each case being chosen so that the enlargement factor is 1.05; one sees that even in this case of marginal enlargement, the phase variations after nonlinear interaction are significantly reduced relative to the initial phase. The Gaussian form of the amplitude spectrum, namely the curves C0a, C0b, C0c, is also shown for reference in the graphs of FIGS. 3a, 3b and 3c.

Phase Extraction Algorithm

Once the measurement of the spectrum is obtained, the measurement of the spectral phase difference between the signal pulse to be measured and the secondary reference pulse is done very simply through a technique described in the document (DJ) and initially proposed in the document: Froehly C., Lacourt A., Vienot J. C.: "Notions de réponse impulsionnelle et de fonction de transfert temporelles des pupilles optiques, justifications expérimentales et applications" ["*Notions of pulsed response and temporal transfer function of optical pupils, experimental proof and application*"], J. Opt. (Paris) 4 (1973) 183. Other phase extraction methods could also be used without changing the principle of the invention.

If the spectral phase variations of the output pulse from the nonlinear material can be neglected, the spectral phase difference directly, neglecting the phase variations in the DMNL device and any accessory devices, gives the sum of the phase of the signal and of the phase introduced by the separator. The latter phase can, in some cases, be negligible. In the contrary case, one skilled in the art will know how to take it into account, either through an independent measurement of this phase, or by offsetting it by adding a device identical in phase to the separator, between the DMNL device and the recombination device R, such that the measurement directly provides the phase of the signal alone.

If the phase variations of the secondary reference pulse are not sufficiently low to be neglected, the measured phase difference can be used as provisional phase in a calculation of the simulated phase of the reference pulse by the method described above. One obtains a new provisional phase by adding this simulated phase to the measured phase difference. The iteration of this procedure leads to the phase measurement.

This technique of iteration through calculation can be replaced and/or completed by a physical iteration; to this end, the example described above can be used.

In the example illustrated in 4, which differs from the assembly of FIG. 1, the insertion of a DMFT generator device modifies the temporal form on the reference path between the separator S and the DMNL nonlinear interaction device. Starting from a situation where, for DMNL, the generator introduces a null phase change, the phase difference measured by (SSI) can be introduced into the pulse shaper in order to obtain a phase of the primary reference pulse having reduced phase variations relative to the original phase. The result is a secondary phase reference pulse closer to a constant. A new (SSI) measurement then provides a better approximation of the pulse phase to be measured and the operation can be iterated until the desired precision is obtained.

The iteration techniques through calculation and physics can be combined to achieve an optimal measurement strategy from the perspective of the number of measurements and precision to be achieved. The best strategy will depend on the phase to be measured. If this is relatively close to a constant phase, the iteration by calculation may suffice. In the contrary case, the generator device is needed. Indeed, as discussed above, the principle of the invention rests on the reduction of phase variations through the multiplicity of frequency contributions to the nonlinear signal, this being done in particular when the conditions lead to an enlargement of the spectrum. If the phase variations are significant, the spectrum is not enlarged, but narrowed as appears in FIGS. 2a, 2b, 2c. Under these conditions, the pulse shaper provides the means to generate an initial reference pulse whereof the spectral phase variations are sufficiently weak to satisfy the conditions needed for the proposed method. Determination of the approximate conditions suitable for programming of the generator may be realized through various techniques such as:

spectral width measurements for various programming in order to localize the conditions leading to enlarged spectrum;

an approximate characterization of the phase using external means and one of the methods of the prior art;

the use of the means of the invention to realize one of the methods of the prior art; it must indeed be noted that the combination of a pulse shaper, a nonlinear material device and a detector constitutes the foundation of the previously cited French patent 02 05872, which describes self-referenced phase measurement procedures.

Figure 5:
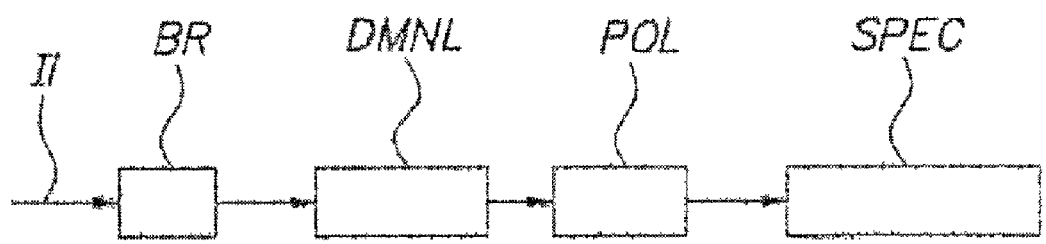
FIG. 5 is a diagrammatic illustration of a third version of assembly according to the invention.
Figure 6:
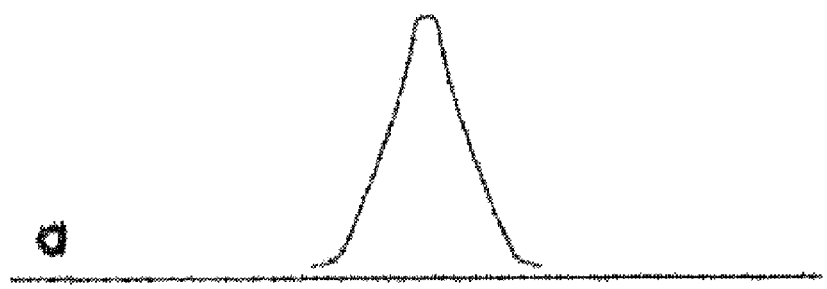
FIG. 6 is a diagrammatic illustration of the signals as a function of time according to the third version of assembly.
Figure 6:
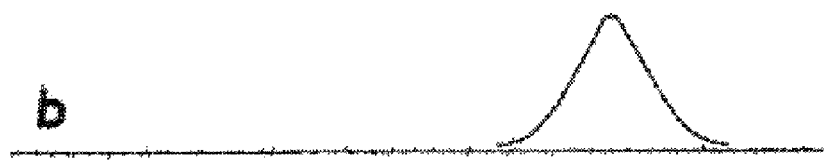
Figure 6:
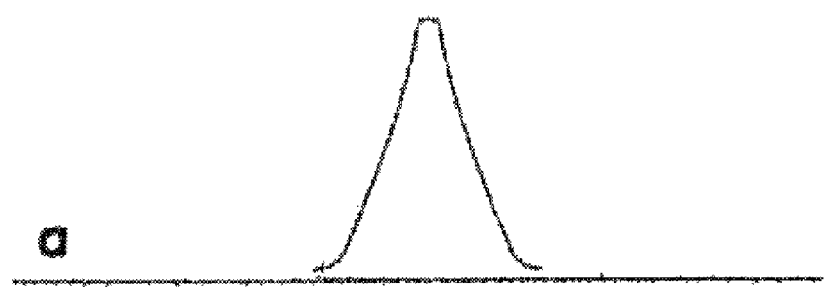
Figure 6:
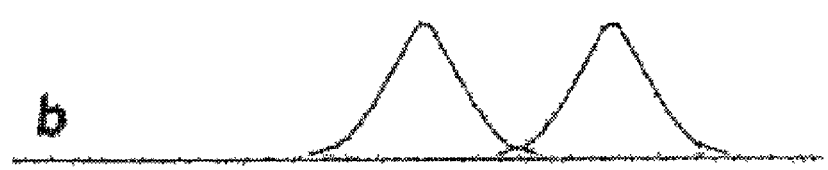

In the example illustrated in FIG. 5, a third version is indicated according to a so-called online configuration. It comprises a single optical path, the signal and reference pulses being distinguished by their polarization. The signal to be measured Ii is first incident on a retardation plate BR which breaks the pulse down into two cross-polarized pulses on axes s and r. For a linear incident polarization, the alpha angle of orientation of the retardation plate determines the relative amplitude of these two components. The propagation time of these two pulses and the difference of these two times constitutes the period needed for the spectral interferometry. The two pulses are incident on the DMNL nonlinear material device having the previously discussed characteristics. One extracts, in the output from the DMNL, with a POL polarizer device, the polarized pulse along the axis s, which also comprises the component s of the retardation material, a component obtained by nonlinear polarization rotation from the component r. As before, a SPEC spectrometer makes it possible to measure the spectral interferometry. The ratio of the two components can be adjusted either by rotating the BR/DMNL/POL assembly around the axis of propagation, or by using, at the input of the measurement device, a polarization rotation component (half-wave plate). To facilitate comprehension of the configuration described, the diagram of FIG. 6 shows the signals according to time and for the two polarizations:

a) output from the retardation plate b) output from the DMNL device (or equivalent manner at the input of the SPEC spectrometer).

Generalization of the Invention

The nonlinear effect of the third order producing a cross polarization (rotation of collinear polarization) is not the only one which can be used in the invention. One can, for example, by creating two replicas to the signal propagating at different angles, obtain through nonlinear effect, a rotation of the polarization of the first induced by the second. Moreover, the combination of two stages of effects of the second order is known in the prior art as producing an effect similar to the direct nonlinear effects of the third order: the first stage produces, by nonlinear effect of summation, a signal around a double frequency of the central frequency, the second stage mixing this signal with the incident signal to obtain, through difference, a signal around the original central frequency.

Other configurations sensitive to the nonlinear effects of the third order are described in the literature and can be useable for the present invention. This is, for example, self-induced diffraction, through which the spatial interference produced by the combination of two replicas of the impulse to be measured propagating over different angles produces an index variation through nonlinear effect which diverts the incident pulse. The reference pulse is then produced over a different direction and can be isolated by spatial filtering. An effect close to the principle is that of the self-induced transitory network, which can diffract a third response of the pulse to be measured.

Other nonlinear effects may be considered, insofar as they can produce a secondary reference pulse whereof the spectrum covers that of the signal pulse.

Realization of Spatial-Temporal Measurements

In the realization of the invention above, the input beams of the recombination device R have an orientation such that they recombine collinearly. A change of relative angle between these two beams makes it possible to obtain a spatial interferometry configuration, as described in the document (Born & Wolf, Principle of Optics Pergamon Press 1980). Considering for example the measurement by a network spectrometer having an input slot along the direction x, and a bidimensional detector, a misalignment of the beams along the direction x allows a spatial/temporal measurement at a spatial dimension, the spatial information being contained in the phase variation of the oscillations along the direction x and the temporal information along the perpendicular direction y.

Alternatively, additional beam separation and recombination devices following different angles can be added to the assembly to obtain, through interferometry, bidimensional spatial phase information, according to configurations which can easily be designed by one skilled in the art.

The invention can be used in order to optimize output characteristics of laser systems. The laser then comprises one or several forming devices whereof the characteristics will be modified in a retroaction loop in order to obtain the characteristics desired by the user. In many cases, the desired characteristic is the cancellation of spectral phase variations.

In the general case, a particularly interesting use appears in the configurations where a DMFT forming device is implemented. One can consider using this forming device not only in its measurement function of the invention, but also to obtain a desired pulse characteristic.

Figure 4:
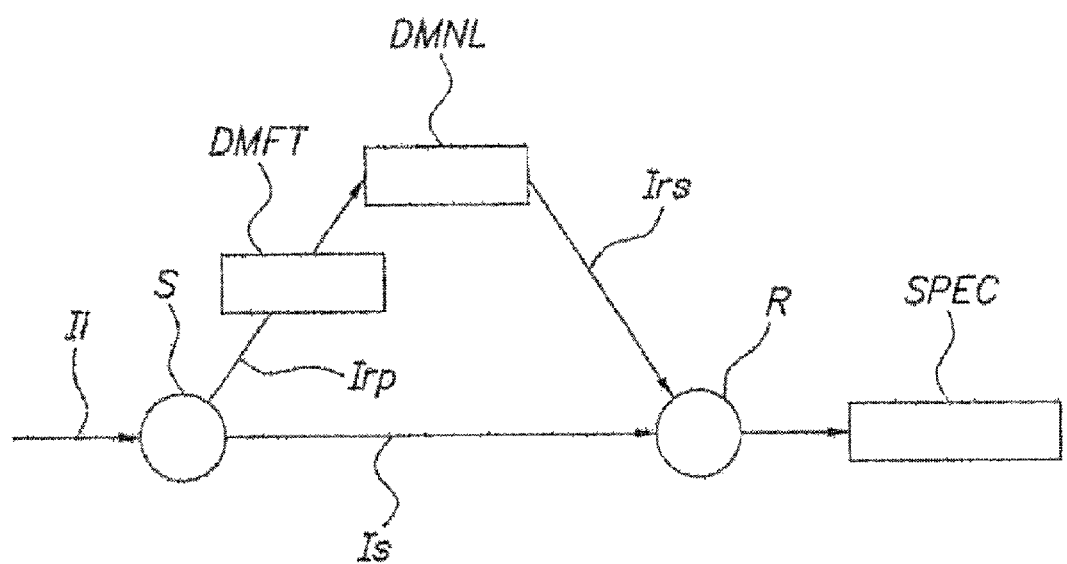
FIG. 4 is a diagrammatic illustration of a second version of assembly according to the invention.
Figure 7:
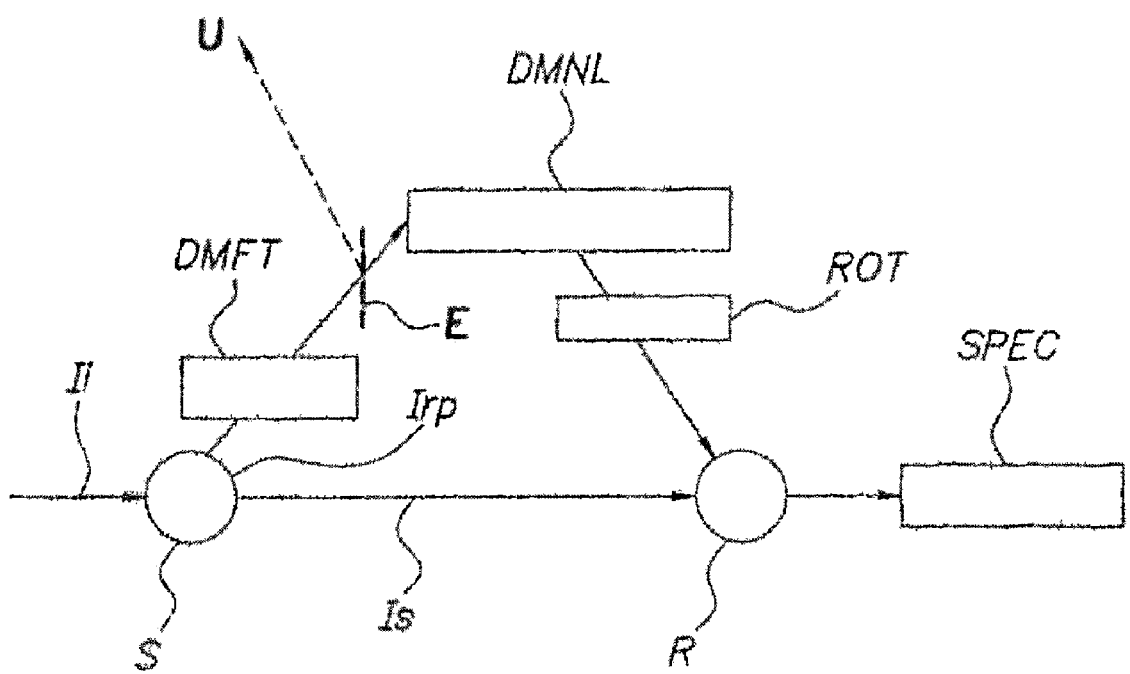
FIG. 7 is a diagrammatic illustration of a fourth version of assembly according to the invention.

In the example illustrated in FIG. 7, the device according to FIG. 4, in which the nonlinear effect used is the cross-polarized wave effect (XPW), is modified by the addition of a pulse extractor E removable between the DMFT generator device and the nonlinear interaction device DMNL. This extractor can be, for example, a removable mirror, as illustrated in FIG. 7. Moreover, a polarization rotation device ROT is inserted between the DMNL nonlinear interaction device and the recombination device R. In the absence of the pulse extractor E, and when the polarization rotation device ROT is adjusted in order not to produce polarization rotation, the configuration is essentially identical to that illustrated in FIG. 4, and allows measurement of the spectral phase of the input pulse Ii. If the polarization rotation device ROT is adjusted for a polarization rotation of 90 degrees, the assembly realizes a spectral interferometry of Is with the wave linearly transmitted by the DMNL nonlinear interaction device. By neglecting or calculating the phase variations caused by this linear transmission, one deduces a measurement of the phase introduced by the DMFT formation device from the spectral interferometry. When the pulse extractor E is put into place, the extracted signal U has a known phase because it is the sum of the incident phase and that of the DMFT generator device, measured through measurement without and with polarization rotation, respectively. Various embodiments of this principle may be considered, such as, for example, the realization of the extraction function through the combination of a polarization rotator and a reflector sensitive to the polarization. As in the preceding examples, the phases of the various additional devices must be negligible or measurable, or able to be offset by added devices on the other interferometry path.

The invention claimed is:

1. A method for measuring the spectral phase or combined spectral and spatial phases of an ultra short light pulse, said method comprising:
   decomposing of said ultra short light pulse into a signal pulse and primary reference pulse, the signal pulse and the primary reference pulse having at least one of polarization and propagation direction being different from one another and having frequencies and phases essentially identical to those of said ultra short light pulse,
   subjecting said primary reference pulse to nonlinear interaction of odd order greater than or equal to 3, said step of subjecting comprising effecting a frequency mixing to produce a secondary reference pulse of average frequency essentially identical to that of the primary reference pulse, the spectral width of said secondary reference pulse being greater than the spectral width of said primary reference pulse, and
   performing a spectral interferometry measurement of the interference between the signal pulse and said secondary reference pulse.

2. The method according to claim 1, wherein said step of subjecting said primary reference pulse to said non linear interaction comprises using a single non linear process of order 3.

3. The method according to claim 1, wherein said step of subjecting said primary reference pulse to said non linear interaction comprises subjecting said primary reference pulse to a combination of non-linear interactions of at least two non-linear processes resulting in an effective non linear process of order 3.

4. An apparatus to measure the spectral phase or combined spectral and spatial phases of an ultrashort light pulse, said apparatus comprising:
   pulse splitter device producing a decomposition of said ultra-short light pulse into a signal pulse and a primary reference pulse, of different polarization and having frequencies and phases essentially identical to those of said ultra-short light pulse;
   at least one non linear optical medium having an effective non linear interaction of odd order greater than or equal to 3 to produce by non-linear interaction with a polarized ultrashort pulse, the generation of a secondary reference pulse with average optical frequency essentially identical to the primary reference pulse;
   said non linear optical medium being coupled to receive said primary reference pulse and to produce the secondary reference pulse cross polarized to the primary reference pulse;
   a recombination device to recombine said secondary reference pulse and said signal pulse to output a combined signal, and
   at least one spectrally resolving instrument to measure the intensity of said combined signal as a function of wavelength to produce spectral to perform spectral interferometry measurement.

5. The apparatus according to claim 4, wherein the non linear optical medium is BaF2.

6. The apparatus according to claim 4, wherein the non linear optical medium is LiF.

7. The apparatus according to claim 4, wherein the pulse splitter consists of a first polarizer and at least one retardation plate, the complete apparatus consisting of a colinear arrangement along the optical path of said pulse splitter, the non linear medium, a second polarizer and a spectrometer.

8. The apparatus according to claim 4, wherein said primary reference pulse is coupled to said non-linear optical medium, through a pulse shaper consisting of an Acousto-Optic Dispersive filter (AOPDF), tuned so as to obtain a secondary reference pulse of essentially constant phase with respect to optical frequency.

9. The apparatus according to claim 8, further comprising a polarization rotation device inserted on the optical path between said non linear optical medium and said at least one spectrally resolving instrument, to produce two interferometry measurements corresponding respectively to the interference of the primary reference pulse with the signal pulse and to the interference of the secondary reference pulse with the signal pulse, said combination of measurements allowing the simultaneous characterization of the pulse characteristics and AOPDF dispersion characteristics for realization of a quantitative programmable phase optical pulse generator function.

* * * * *